(12) United States Patent
Shivaswamy et al.

(10) Patent No.: US 10,552,428 B2
(45) Date of Patent: Feb. 4, 2020

(54) FIRST PASS RANKER CALIBRATION FOR NEWS FEED RANKING

(71) Applicant: Microsoft Technology Licensing, LLC, Redmond, WA (US)

(72) Inventors: Pannagadatta K. Shivaswamy, Sunnyvale, CA (US); Nikita Igorevych Lytkin, Sunnyvale, CA (US); Yanen Li, Foster City, CA (US); Guy Lebanon, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/172,649

(22) Filed: Jun. 3, 2016

(65) Prior Publication Data

US 2017/0351679 A1  Dec. 7, 2017

(51) Int. Cl.
| | | |
|---|---|---|
| G06F 17/30 | (2006.01) | |
| G06F 16/2457 | (2019.01) | |
| H04L 12/58 | (2006.01) | |
| G06N 20/00 | (2019.01) | |
| G06N 20/10 | (2019.01) | |

(52) U.S. Cl.
CPC ....... *G06F 16/24578* (2019.01); *G06N 20/00* (2019.01); *G06N 20/10* (2019.01); *H04L 51/32* (2013.01)

(58) Field of Classification Search
CPC .......... G06F 17/3053; G06F 17/30867; G06F 16/24578; G06N 99/005; G06N 20/00; H04L 51/32

USPC ........ 707/E17.064, 748, 749; 705/7.19, 7.38
See application file for complete search history.

(56) References Cited

U.S. PATENT DOCUMENTS

| | | | |
|---|---|---|---|
| 8,429,244 B2* | 4/2013 | Naimark | G06Q 30/02 709/217 |
| 8,631,001 B2* | 1/2014 | Lawrence | G06F 16/951 707/723 |
| 2004/0103051 A1* | 5/2004 | Reed | G06Q 30/02 705/36 R |
| 2007/0078815 A1* | 4/2007 | Weng | G06F 16/243 |
| 2007/0204308 A1* | 8/2007 | Nicholas | H04N 7/17318 725/86 |
| 2008/0126476 A1* | 5/2008 | Nicholas | G06Q 10/10 709/203 |
| 2008/0294624 A1* | 11/2008 | Kanigsberg | G06F 17/30867 |
| 2009/0172021 A1* | 7/2009 | Kane | G06F 17/30873 |
| 2011/0035385 A1* | 2/2011 | Teicher | A63F 13/12 707/748 |

(Continued)

*Primary Examiner* — Shiow-Jy Fan
(74) *Attorney, Agent, or Firm* — Schwegman Lundberg & Woessner, P.A.

(57) ABSTRACT

An on-line social network system is configured to generate a news feed for a member by processing updates originating from different sources using different first pass ranker models. The first pass ranker models generate respective sets of raw scores, which are calibrated based on a consistent scale of feed engagement metrics of interest, such as a click through rate. The calibrated scores are then used as training data to train a second pass ranker and/or as input into the second pass ranker at the time when the second pass ranker is to generate respective ranks for items in an inventory of updates identified as potentially of interest to a focus member and to select a subset of items from the inventory based on the generated respective ranks.

20 Claims, 4 Drawing Sheets

(56) References Cited

U.S. PATENT DOCUMENTS

| | | | |
|---|---|---|---|
| 2011/0276507 A1* | 11/2011 | O'Malley | G06Q 10/00 |
| | | | 705/321 |
| 2012/0203832 A1* | 8/2012 | Vastardis | G06Q 30/0241 |
| | | | 709/204 |
| 2012/0296919 A1* | 11/2012 | Sinha | H04L 67/22 |
| | | | 707/749 |
| 2013/0086078 A1* | 4/2013 | Malleshaiah | G06Q 30/02 |
| | | | 707/748 |
| 2013/0246521 A1* | 9/2013 | Schacht | G06Q 50/01 |
| | | | 709/204 |
| 2014/0012619 A1* | 1/2014 | Natarajan | H04L 51/32 |
| | | | 705/7.19 |
| 2014/0089327 A1* | 3/2014 | Pavlidis | G06Q 30/02 |
| | | | 707/749 |
| 2014/0278821 A1* | 9/2014 | McConnell | G06Q 10/0639 |
| | | | 705/7.38 |
| 2017/0142044 A1* | 5/2017 | Ball | H04L 51/12 |
| 2017/0171139 A1* | 6/2017 | Marra | H04L 51/32 |
| 2017/0262445 A1* | 9/2017 | Jeon | G06F 17/3053 |
| 2017/0323340 A1* | 11/2017 | Jeon | G06Q 30/0261 |

* cited by examiner

FIRST PASS RANKER CALIBRATION FOR NEWS FEED RANKING

TECHNICAL FIELD

This application relates to the technical fields of software and/or hardware technology and, in one example embodiment, to system and method to normalize first pass ranker scores generated by a news feed system in an on-line social network.

BACKGROUND

An on-line social network may be viewed as a platform to connect people and share information in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member.

A member of on-line social network may be permitted to share information with other members by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to normalize first pass ranker scores generated by a news feed system in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile of a member may also include information about the member's current and past employment, such as company identifications, professional titles held by the associated member at the respective companies, as well as the member's dates of employment at those companies. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. The on-line social network system, in some embodiments, also permits a one-sided connection, where a member is permitted to follow another member or another entity, such as a company, a university, etc. When a member follows another member or entity, that member's profile is associated with a link indicative of a one-sided connection, where, e.g., the member receives updates regarding the other member or the entity that the member follows.

An update, for the purposes of this description, is an information item for presentation to one or more members represented by respective member profiles in the on-line social network system. The updates may be presented as part of the member's so-called news feed. A news feed may be provided to a member on a dedicated web page, e.g., on a home page of the member in the on-line social network. A news feed page is generated for each member by a news feed system provided with the on-line social network system and includes items that has been determined as being potentially of interest to that member. Examples of items in the news feed generated for a member are posts and news with respect to the connections of that member and the entities that the member is following, as well as job postings that have been determined as relevant to the member. As there may be a rather large inventory of updates available for inclusion into a member's news feed, the news feed system is configured to select a subset of all available updates for inclusion into the news feed. Such selection maybe based on various selection criteria, such as, e.g., the degree of relevance of an update item with respect to the member, the degree of connection between the member and the source of the update, etc. A member for whom a news feed is being generated is referred, for the purposes of this description, a focus member, and the profile representing the focus member in the on-line social network system is referred to as a focus profile.

When the process of generating a news feed for a member is initiated, the news feed system identifies those updates that may be potentially of interest to the focus member. These updates are first processed and ranked by so-called first pass rankers (FPRs), which may also be referred to as a preliminary ranker. A given FPR generates for each update in its queue an FPR score (also referred to as a preliminary ranker score). Updates from different sources are processed by different FPRs. For example, updates about members who are connections of the focus member (either mutual connections or entities that is being followed by the focus member) are processed by one FPR, the news articles are ranked by another FPR, and the job postings are ranked by a further FPR. From the FPR, a subset of highest-ranked update items is provided to a so-called second pass ranker (SPR). For example, from all news articles that have been processed by an associated FPR model only those sufficiently relevant to the focus member are provided to the SPR.

The SPR, which may be part of the news feed system and may employ a statistical model (an SPR model), processes the inventory of updates for the focus member (after it has been through the FPR) in order to select a final set of updates. The final set of updates is then included in the news feed web page that is being generated for the focus member. The SPR ranks the items in the inventory of updates utilizing, e.g., a statistical model, such as logistic regression. The SPR takes, as input, the attributes characterizing respective updates, the attributes characterizing the focus member, as well as the FPR scores generated by the FPRs for respective updates. Such attributes may include the type of the item (e.g., job recommendation, connection recommendation, news article share, etc.), focus member's past counts of interactions with items of this type, profile attributes of the focus member (e.g., skills, industry, education, etc.), as well as profile attributes of the member whose activity resulted in generation of this item (e.g., member article share), etc. The SPR is trained on demand or on a periodic basis using various types of training data, such as, e.g., historical data reflecting members' interactions with updates.

FPRs utilize respective statistical models (FPR models) for generating FPR scores. In one embodiment, an FPR model generates a score for an update based on the features that characterize the update and the features that characterize the member for whom the feed is being produced. This score represents estimated relevance of the update to the member for whom the feed is being prepared. An FPR may utilize an FPR model that produces scores that estimate the levels of engagement of the member with the respective updates in the feed (e.g., the feed CTR with respect to the update when/if presented in the member's feed).

The same FPR may serve results (including FPR scores) using different models for different members. This is typically done for the purposes of AB testing and improvement of FPR models. FPR model identification (ID) is used to distinguish the different models. Different models may have different distributions of scores they return. E.g., score distributions may differ in range, mean, median, variance, etc. Moreover, the same score value from different models within an FPR may correspond to different engagement levels in the feed, e.g., different click through rates (CTRs). For example, the score of 0.6 from model A in a given FPR may correspond to CTR of 0.5 in the feed, while the score of 0.6 from model B in the same FPR may correspond to CTR of 0.65.

The SPR model may use FPR scores as features when estimating interaction (such as CTR) and viral action rates (VAR) with items from the FPRs in the feed. The SPR model produces estimates of engagement in the feed given FPR score and other features. As a result, when a new FPR model goes online, the SPR model may need to be retrained in order to estimate SPR model parameters corresponding to the new FPR model due to the possible changes in the FPR score distribution as discussed above. Given a large number of FPRs and underlying models being tested, SPR retraining may be needed very frequently. However, this is not always possible for practical reasons and puts SPR and FPRs into a tight coupling.

The methodology referred to as FPR calibration for the purposes of this description addresses this challenge by putting scores from different FPR models onto a consistent scale of feed engagement metrics of interest such as CTR and VAR. Specifically, as each score from a set of raw scores generated by a given FPR model corresponds to a respective feed engagement value reflecting a member's engagement with an update from a news feed generated for the member in the on-line social network system, a calibration component of the news feed system automatically builds a mapping from the raw scores to the feed engagement values. In some embodiments, the feed engagement values reflect CTR, or VAR, or a combination of both. FPR calibration thus puts scores from different FPR models onto a consistent scale of the feed engagement metrics, such as, e.g., CTR or VAR. This is achieved, in one example embodiment, by fitting a statistical model that takes raw FPR score as input variable and applies a statistical model such as Logistic regression, Nadaraya-Watson kernel regression, or a spline in order to model feed engagement metrics as a function of FPR score. In some embodiments, in addition to using FPR score as input variable in the FPR calibration model, additional transformations (such as log and powers) of the FPR score are taken as inputs in order to allow FPR calibration model capture non-linear and non-monotone relationships between FPR scores and feed engagement metrics.

The SPR model is then trained using calibrated FPR scores as features instead of using the raw (uncalibrated) FPR scores. This approach may permit the SPR model retraining to be done independently of appearance of any new FPR models while also using calibrated FPR scores as features in the SPR model for better estimation of engagement with the FPR's items in the feed. The calibrated FPR scores are used as input into the SPR to generate respective ranks for items in an inventory of updates identified as potentially of interest to a focus member and to select a subset of items from the inventory based on the generated respective ranks.

Figure 1:
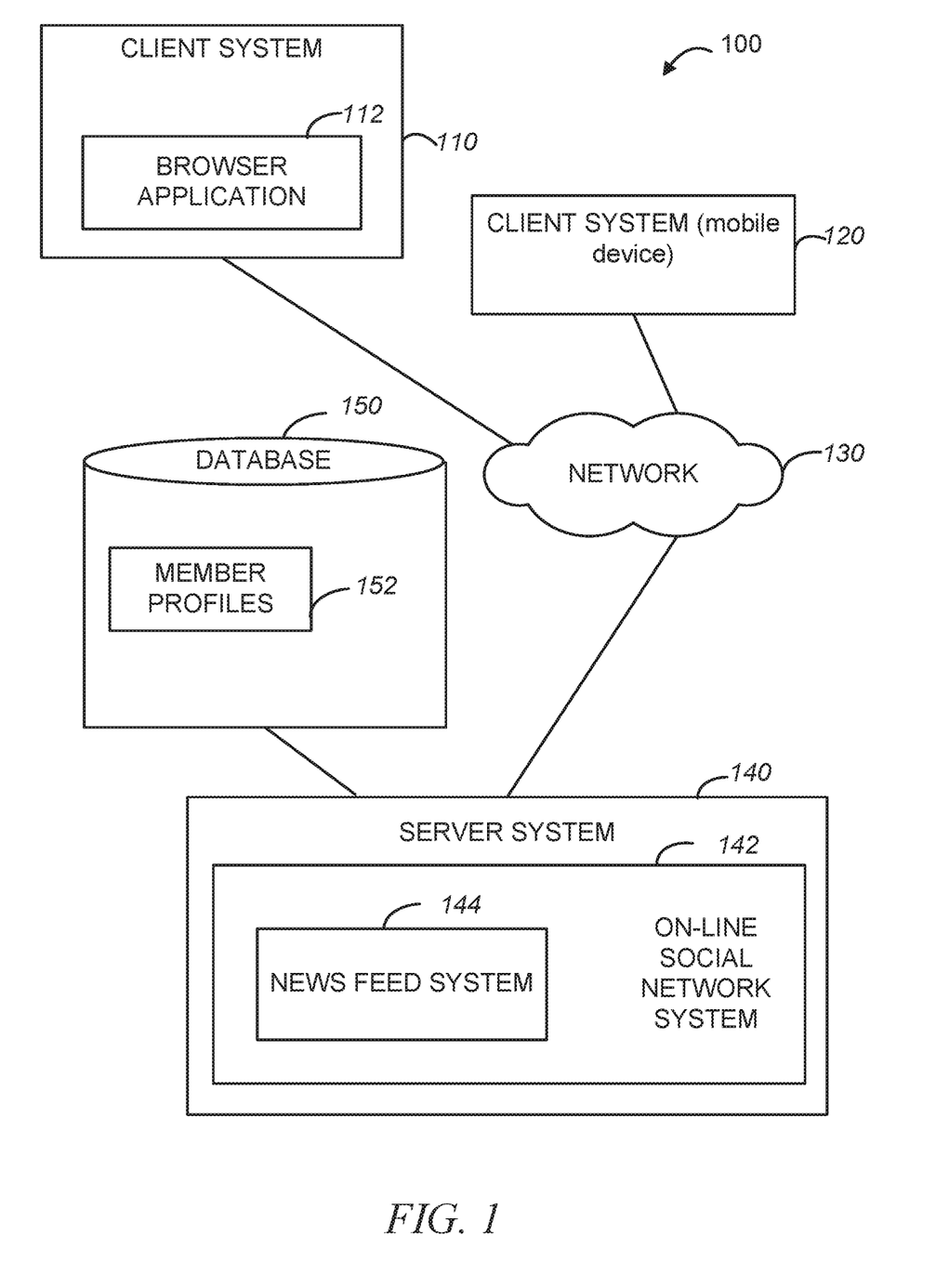
FIG. 1 is a diagrammatic representation of a network environment within which an example method and system to normalize first pass ranker scores generated by a news feed system in an on-line social network may be implemented.

Example method and system to normalize first pass ranker scores generated by a news feed system in an on-line social network may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a news feed system 144 that may be utilized beneficially to determine respective success scores for higher education institutions referred to as schools for the sake of brevity. The news feed system 144 may be configured to determine . . . .

Figure 2:
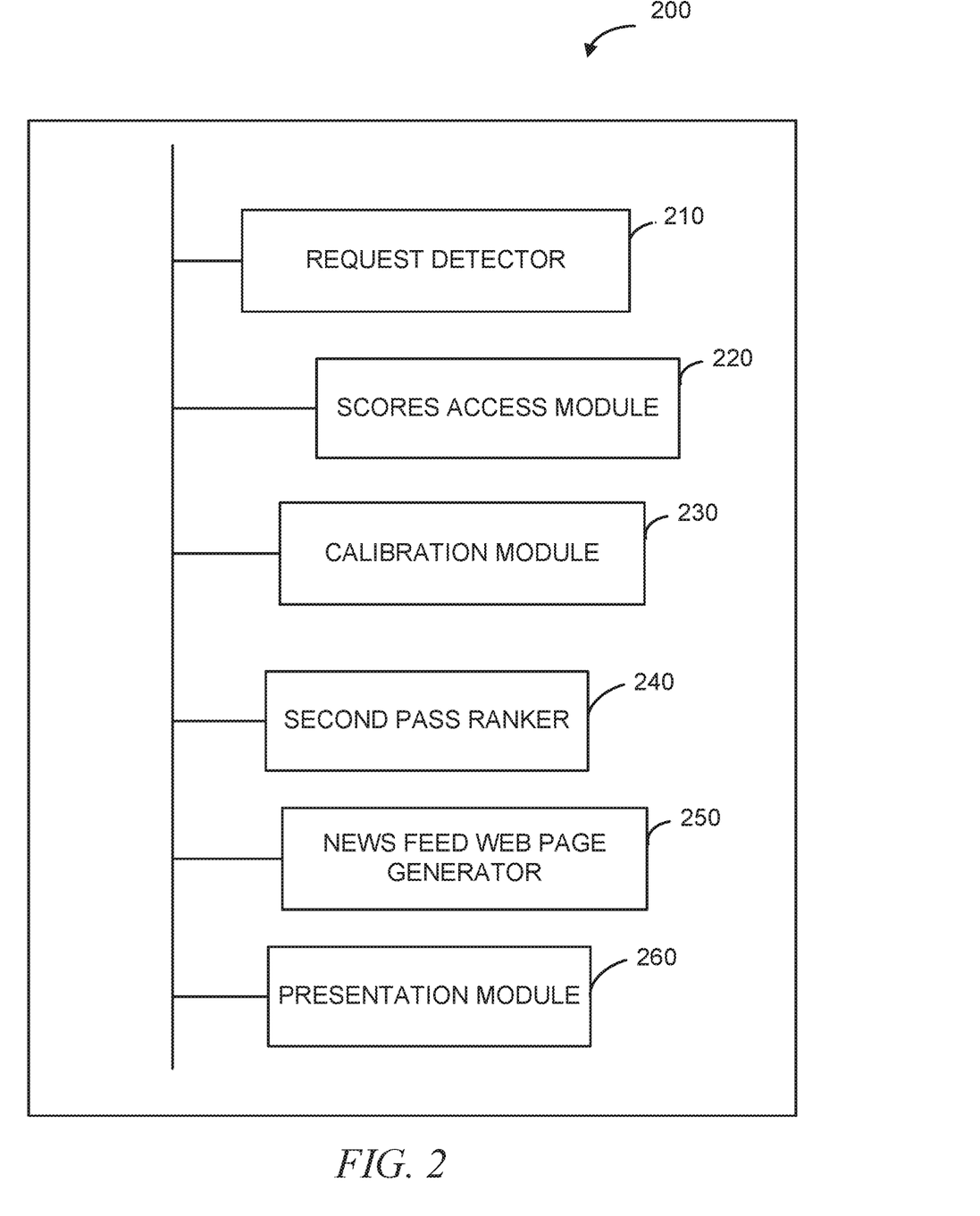
FIG. 2 is block diagram of a system to normalize first pass ranker scores generated by a news feed system in an on-line social network, in accordance with one example embodiment.

An example news feed system 144 is illustrated in FIG. 2.

FIG. 2 is a block diagram of a system 200 to normalize first pass ranker scores generated by a news feed system in an on-line social network, in accordance with one example embodiment. As shown in FIG. 2, the system 200 includes a request detector 210, a scores access module 220, a calibration module 230, a second pass ranker 240, a news feed web page generator 250, and a presentation module 270. The request detector 210 is configured to detect a request to generate a news feed web page for a focus member represented by a profile in the on-line social network system 142 of FIG. 1. The profile of a focus member is characterized by a set of profile features that may indicate the member's employment history, education, geographic location, etc. The scores access module 220 is configured to access a set of raw scores generated by various FPR models. In one example, a set of raw scores comprises a first set of scores generated by a first preliminary ranker (using an FPR model having a certain unique model ID) for updates of a first category (e.g., posts from a member who is a connection of the focus member) and a second set of scores generated by a second preliminary ranker (using another FPR model having a different unique model ID) for updates of a second category (e.g., job postings). In this example, each score from the set of raw scores corresponds to a respective feed engagement value reflecting a member's engagement with an update from a news feed generated for the member in the on-line social network system 142, such as, e.g., a value reflecting CTR or VAR. In one embodiment, the FPR models are trained using so-called engagement features. For example, the system 200 may include a monitor configured to monitor engagement events with respect to updates of the first category in news feeds generated for members in the on-line social network system 142, generate engagement features based on the monitored events and include the engagement features as training data for training an associated FPR model.

The calibration module 230 is configured to generate a mapping from scores in the set of raw scores to their respective feed engagement values to produce a set of calibrated preliminary ranker scores. These calibrated preliminary ranker scores are suitable to be used as training data and/or real time input for the second pass ranker 240. The second pass ranker 240 is configured to generate respective ranks for items in an inventory of updates identified as potentially of interest to a focus member represented by a focus profile in the on-line social network system 142 and to select a subset of items from the inventory based on the generated respective ranks. The subset of items from the inventory is what is to be presented to the focus member on their news feed web page. The second pass ranker 240 uses the set of calibrated preliminary scores as well as a set of focus member features that characterize the focus profile as input. As mentioned above, the second pass ranker 260 is trained using calibrated preliminary scores as training data.

The news feed web page generator 250 is configured to generate news feed web pages for presentation to members represented by respective member profiles in the on-line social network system 142. The presentation module 270 is configured to cause presentation of the news feed web page on a display device of the focus member. Some operations performed by the system 200 may be described with reference to FIG. 3.

Figure 3:
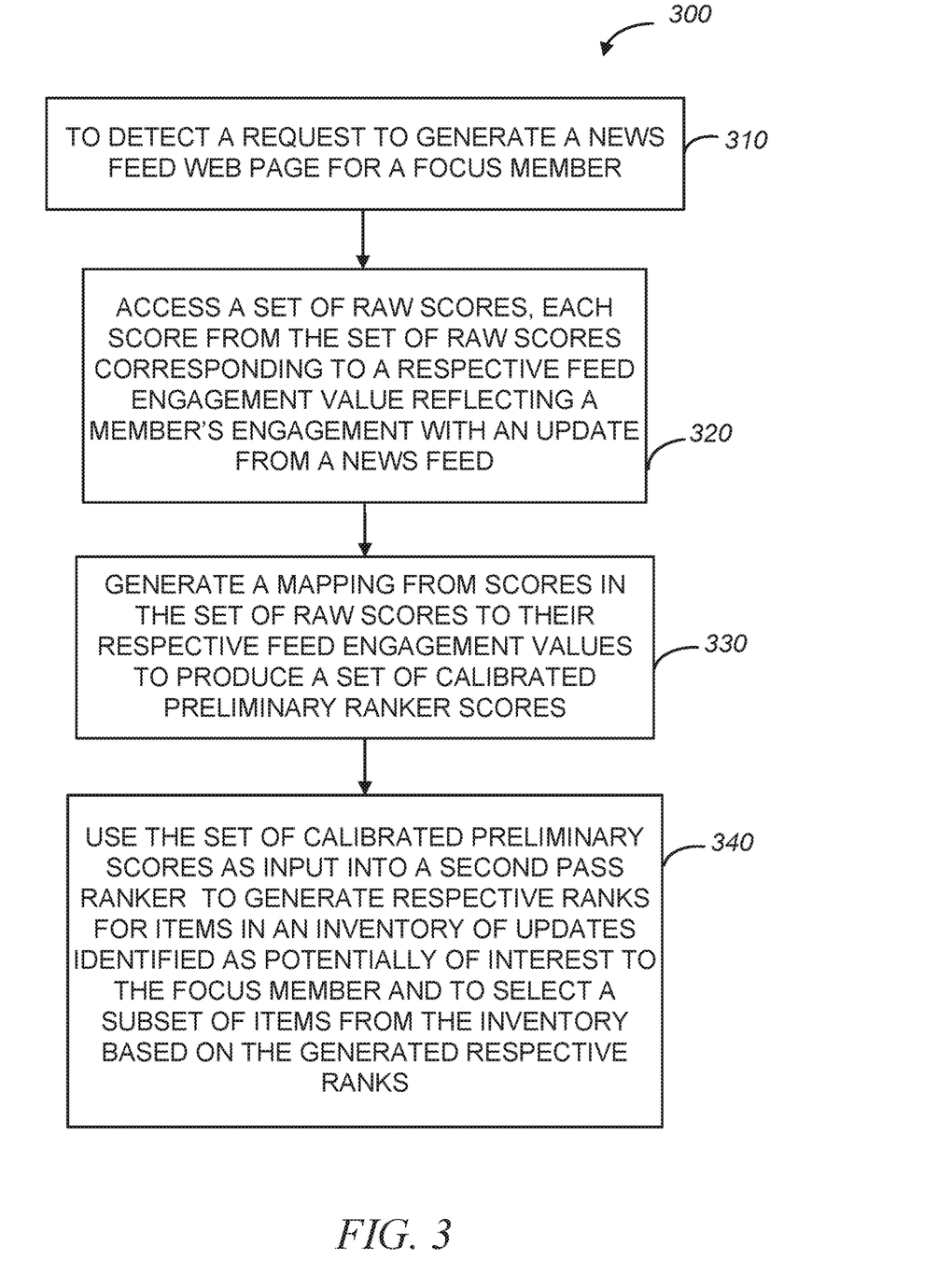
FIG. 3 is a flow chart of a method to normalize first pass ranker scores generated by a news feed system in an on-line social network, in accordance with an example embodiment.

FIG. 3 is a flow chart of a method 300 to normalize first pass ranker scores generated by a news feed system in an on-line social network for a member, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the request detector 210 detects a request to generate a news feed web page for a focus member represented by a profile in the on-line social network system 142 of FIG. 1. At operation 320, the scores access module 220 accesses a set of raw scores generated by various FPR models. The calibration module 230 generates a mapping from scores in the set of raw scores to their respective feed engagement values to produce a set of calibrated preliminary ranker scores at operation 330. These calibrated preliminary ranker scores are used as input for the second pass ranker 240 at operation 340.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
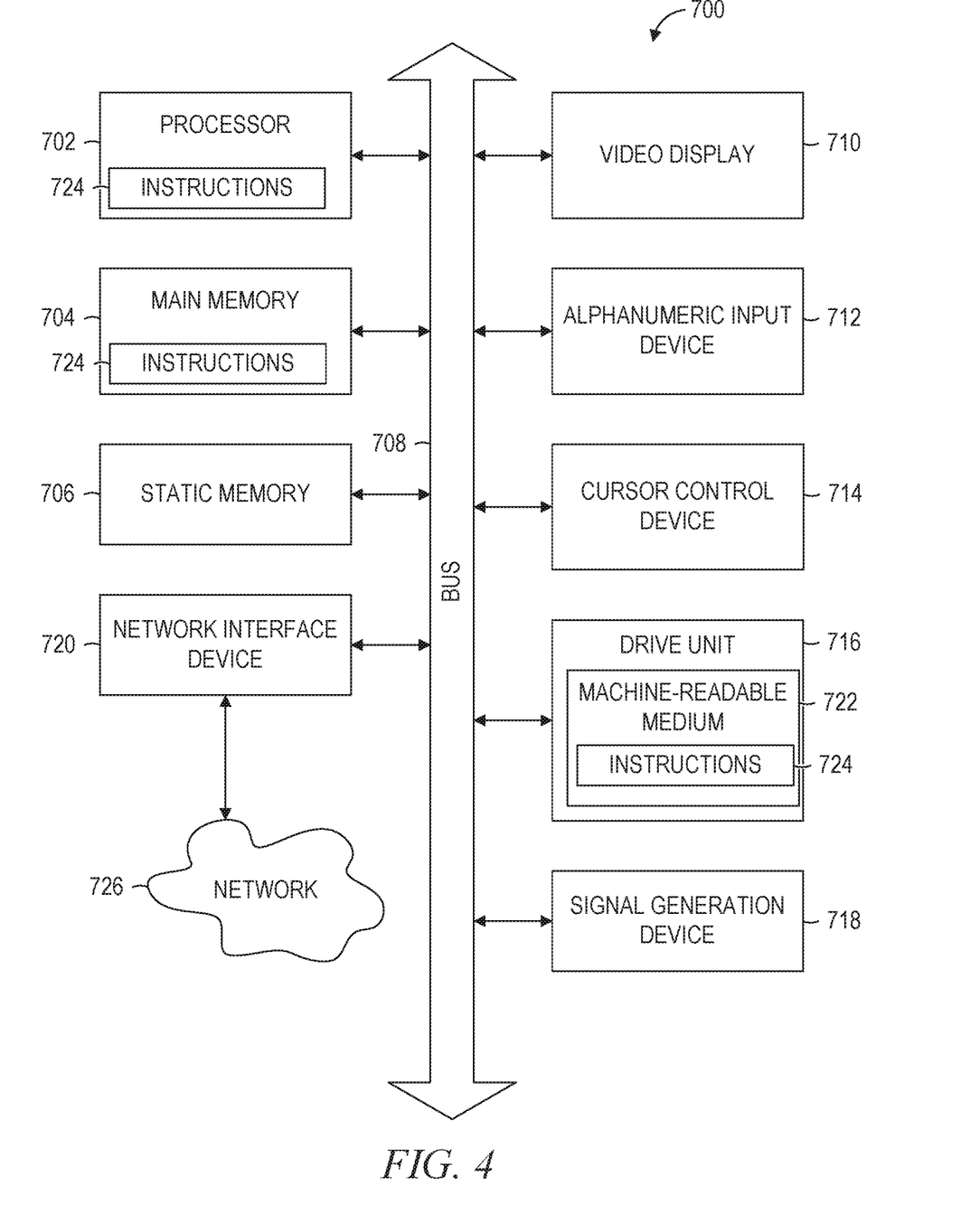
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to normalize first pass ranker scores generated by a news feed system in an on-line social network have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   detecting a request to generate a news feed web page for a focus member represented by a profile in an on-line social network system, the news feed web page to display selected updates that represent content items associated with respective categories, a first category from the respective categories indicating a first source from which updates displayed on the news feed web page generated for a focus member originated and a second category from the respective categories indicating a second source from which updates displayed on the news feed web page generated for a focus member originated;
   processing updates that originated from the first source by a first preliminary ranker model to generate a first set of scores;
   processing updates that originated from the second source by a second preliminary ranker model to generate a second set of scores;
   accessing a set of raw scores comprising the first set of scores and the second set of scores, each score from the set of raw scores reflecting a member's interaction with an update;
   using at least one processor, producing a set of calibrated preliminary ranker scores by executing a statistical model using the set of raw scores as input;
   using the set of calibrated preliminary ranker scores as input into a second pass ranker model, the second pass ranker model to generate respective ranks for items in an inventory of updates identified as potentially of interest to the focus member and to select a subset of items from the inventory of updates based on the generated respective ranks.

2. The method of claim 1, wherein the statistical model is logistic regression or Nadaraya-Watson kernel regression.

3. The method of claim 2, wherein the statistical model takes, as input, a transformation of the set of raw scores, the transformation is a logarithmic or an exponential function.

4. The method of claim 1, comprising:
   constructing a news feed web page that includes the subset of items from the inventory; and
   causing presentation of the news feed web page on a display device of the focus member.

5. The method of claim 1, comprising including scores from the set of calibrated preliminary ranker scores, as training data for training the second pass ranker model.

6. The method of claim 1, wherein a score from the set of raw scores represents estimated relevance of an update to the focus member and the respective feed engagement value reflects a click through rate.

7. The method of claim 1, comprising:
   monitoring engagement events with respect to updates of the first category in news feeds generated for members in the on-line social network system;
   generating engagement features based on the monitored events; and
   including the engagement features as training data for training the first preliminary ranker model.

8. The method of claim 7, wherein the monitored events are views or viral actions with respect to items in a news feed generated in the on-line social network system.

9. The method of claim 1, wherein updates of the first category are updates posted by members who are connections of the focus member in the on-line social network system.

10. The method of claim 1, wherein updates of the second category are job postings.

11. A computer-implemented system comprising:
   one or more processors; and
   a non-transitory computer readable storage medium comprising instructions that when executed by the one or processors cause the one or more processors to perform operations comprising:

detecting a request to generate a news feed web page for a focus member represented by a profile in an on-line social network system, the news feed web page to display selected updates that represent content items associated with respective categories, a first category from the respective categories indicating a first source from which updates displayed on the news feed web page generated for a focus member originated and a second category from the respective categories indicating a second source from which updates displayed on the news feed web page generated for a focus member originated;

processing updates that originated from the first source by a first preliminary ranker model to generate a first set of scores;

processing updates that originated from the second source by a second preliminary ranker model to generate a second set of scores;

accessing a set of raw scores comprising the first set of scores and the second set of scores, each score from the set of raw scores reflecting a member's interaction with an update;

producing a set of calibrated preliminary ranker scores by executing a statistical model using the set of raw scores as input;

using the set of calibrated preliminary ranker scores as input into a second pass ranker model, the second pass ranker model to generate respective ranks for items in an inventory of updates identified as potentially of interest to the focus member and to select a subset of items from the inventory of updates based on the generated respective ranks.

12. The system of claim 11, wherein the statistical model is logistic regression or Nadaraya-Watson kernel regression.

13. The system of claim 12, wherein the statistical model takes, as input, a transformation of the set of raw scores, the transformation is a logarithmic or an exponential function.

14. The system of claim 11, wherein the one or more processors to perform operations comprising:

a news feed web page generator, implemented using at least one processor, to construct constructing a news feed web page that includes the subset of items from the inventory; and a presentation module, implemented using at least one processor, to cause causing presentation of the news feed web page on a display device of the focus member.

15. The system of claim 11, wherein scores from the set of calibrated preliminary ranker scores are used as training data for training the second pass ranker model.

16. The system of claim 11, wherein a score from the set of raw scores represents estimated relevance of an update to the focus member and the respective feed engagement value reflects a click through rate.

17. The system of claim 11, wherein the one or more processors to perform operations comprising:

monitor monitoring engagement events with respect to updates of the first category in news feeds generated for members in the on-line social network system;

generate engagement features based on the monitored events; and include the engagement features as training data for training the first preliminary ranker model.

18. The system of claim 17, wherein the monitored events are views or viral actions with respect to items in a news feed generated in the on-line social network system.

19. The system of claim 11, wherein updates of the first category are updates posted by members who are connections of the focus member in the on-line social network system.

20. A machine-readable non-transitory storage medium having instruction data executable by a machine to cause the machine to perform operations comprising:

detecting a request to generate a news feed web page for a focus member represented by a profile in an on-line social network system, the news feed web page to display selected updates that represent content items associated with respective categories, a first category from the respective categories indicating a first source from which updates displayed on the news feed web page generated for a focus member originated and a second category from the respective categories indicating a second source from which updates displayed on the news feed web page generated for a focus member originated;

processing updates that originated from the first source by a first preliminary ranker model to generate a first set of scores;

processing updates that originated from the second source by a second preliminary ranker model to generate a second set of scores;

accessing a set of raw scores comprising the first set of scores and the second set of scores, each score from the set of raw scores reflecting a member's interaction with an update;

using at least one processor, producing a set of calibrated preliminary ranker scores by executing a statistical model using the set of raw scores as input;

using the set of calibrated preliminary ranker scores as input into a second pass ranker model, the second pass ranker model to generate respective ranks for items in an inventory of updates identified as potentially of interest to the focus member and to select a subset of items from the inventory of updates based on the generated respective ranks.

* * * * *

UNITED STATES PATENT AND TRADEMARK OFFICE
CERTIFICATE OF CORRECTION

PATENT NO. : 10,552,428 B2
APPLICATION NO. : 15/172649
DATED : February 4, 2020
INVENTOR(S) : Shivaswamy et al.

Page 1 of 1

It is certified that error appears in the above-identified patent and that said Letters Patent is hereby corrected as shown below:

In the Claims

In Column 10, Line 65, in Claim 11, after "or", insert --more--

Signed and Sealed this
Fifth Day of May, 2020

Andrei Iancu
*Director of the United States Patent and Trademark Office*